United States Patent [19]
Ogaiwara et al.

[11] Patent Number: 5,212,523
[45] Date of Patent: May 18, 1993

[54] IMAGE READ DEVICE WITH REDUCED MIRROR VIBRATION

[75] Inventors: Masuji Ogaiwara; Takashi Tomaru, both of Kanagawa, Japan

[73] Assignee: Fuji Xerox Co., Ltd., Tokyo, Japan

[21] Appl. No.: 881,968

[22] Filed: May 12, 1992

[30] Foreign Application Priority Data

May 13, 1991 [JP] Japan .................. 3-107289

[51] Int. Cl.$^5$ .................. G03G 15/28
[52] U.S. Cl. .................. 355/233; 355/236; 358/474; 359/872
[58] Field of Search .................. 355/51, 65, 66, 233, 355/235, 236; 359/212, 223, 846, 850, 857, 861, 862, 865, 872; 358/474, 487, 494, 497

[56] References Cited
U.S. PATENT DOCUMENTS

| | | | |
|---|---|---|---|
| 4,579,448 | 4/1986 | Nowak et al. | 355/51 |
| 5,097,290 | 3/1992 | Watanabe | 355/235 X |
| 5,140,443 | 8/1992 | Iwahara et al. | 358/474 |

FOREIGN PATENT DOCUMENTS

| | | |
|---|---|---|
| 63-312772 | 12/1988 | Japan . |
| 1-116662 | 5/1989 | Japan . |
| 1-116664 | 5/1989 | Japan . |
| 2-166880 | 6/1990 | Japan . |

Primary Examiner—A. T. Grimley
Assistant Examiner—William J. Royer
Attorney, Agent, or Firm—Finnegan, Henderson, Farabow, Garrett and Dunner

[57] ABSTRACT

An image read device in which an original document located on a platen glass is exposed to and scanned with a light from a light source, to obtain a light image representative of a picture on the original, and the light image is guided through an optical system including at least first to third mirror elements into an image pick-up unit, is improved in that the natural frequencies of the first to third mirror elements are different from each other. In the image read device, the thicknesses of the second and third mirror elements may be different from each other. Further, the thickness of the first mirror element may be larger than the width of the reflecting surface of the first mirror element as viewed in the slow scan direction.

9 Claims, 4 Drawing Sheets

IMAGE READ DEVICE WITH REDUCED MIRROR VIBRATION

BACKGROUND OF THE INVENTION

1. Field of the Invention

The present invention relates to an image read device in use with a copying machine or a facsimile, for example, and more particularly improvements of an optical system of the image read device which guides light reflected by an original document to an image sensor CCD.

2. Discussion of the Prior Art

Figure 1A:
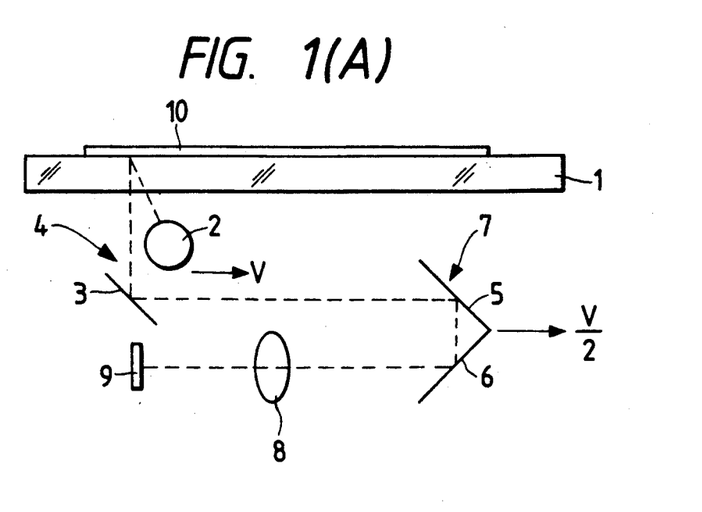
FIG. 1A is a diagrammatic view showing an optical system of an image read device according to an embodiment of the present invention.

An image read device has been used for a copying machine, a facsimile, or the like. The image read device, as shown in FIG. 1A, is made up of a first carriage 4 which moves at velocity "v" along a platen glass 1 and includes a light source 2 and a first mirror element 3, a second carriage 7 which moves at velocity $(\frac{1}{2})v$ (i.e., $\frac{1}{2}$ the velocity of the first carriage 4), and includes a second mirror element 5 and a third mirror element 6, a lens 8 for forming on an image sensor CCD 9 an image with light reflected by the third mirror element 6, and the image sensor CCD 9 for converting the image formed thereon into electrical signals.

To read a picture on an original document 10 located on the platen glass 1, the carriages 4 and 7 are moved while the original 10 is irradiated with light from the light source 2. Light reflected by the surface of the original 10 is guided through an optical system including the first, second and third mirror elements 3, 5 and 6 to the lens 8 which in turn forms an image on the CCD 9.

Figure 2A:
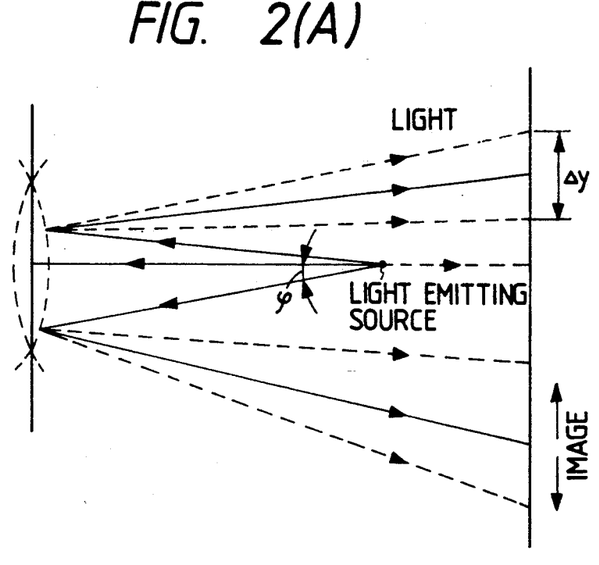
FIG. 2A is an explanatory diagram for explaining a distortion of an image when the first and second mirror elements vibrate.
Figure 3:
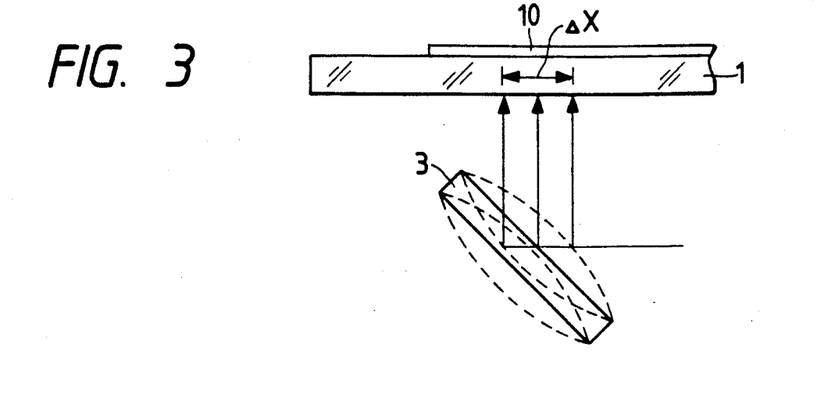
FIG. 3 is an explanatory diagram for explaining how the read position is shifted when the first mirror element vibrates.
Figure 7:
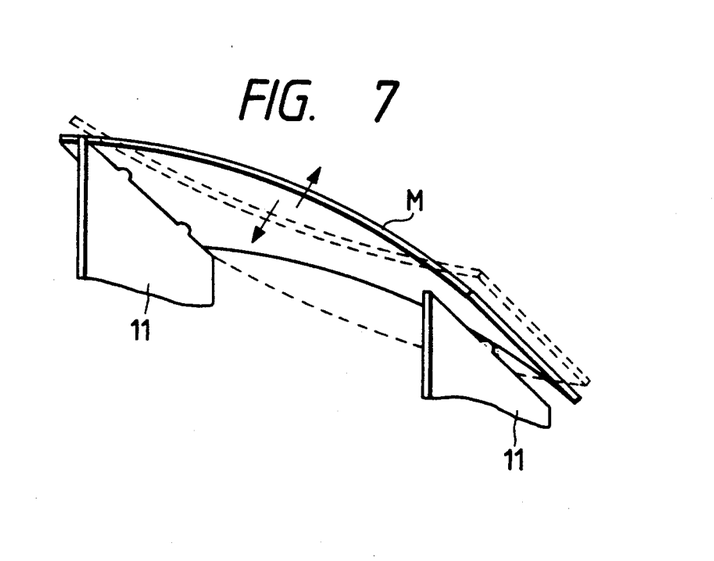
FIG. 7 is a perspective view useful in explaining a vibration of the mirror element.

Usually, a stepping motor is used as a drive source in the scanning system of the image read device. The higher harmonic components of the exciting signal for the motor causes a vibration of the motor. The harmonic components are transferred to the carriages. As shown in FIG. 7, a mirror M is mounted on the carriage, while being supported at both ends by a mirror positioning means 11. With the construction, when the carriage is vibrated, the mirror M vibrates in the direction of the illustrated arrows, so that the mirror is warped as indicated by dotted lines. When the mirror M is warped, in the case of the first mirror element 3, the read position is shifted by $\Delta x$ in the vertical or slow scan direction as shown in FIG. 3, and hence the read image is also shifted. In the case of the second and third mirror elements 5 and 6, the warp of each mirror element brings about a change of the reflected light direction as shown in FIG. 2A. This distorts the read image by $\Delta y$.

Many measures for removing the image shift and distortion caused by the vibration of the scanning system have been proposed. For example, one measure is an anti-vibration means for reducing vibration energy to be transferred to the mirror. Another measure is a damping means for damping vibration energy transferred to the mirror. A further means is to set the natural frequency of the mirror element to be different from the fundamental frequency and a higher harmonic frequency of the stepping motor. For details of the measures, reference is made to Japanese Patent Laid-Open Publication No. Sho. 2-166880 and Japanese Patent Laid-Open Publication No. Sho. 63-312772, for example.

When the first mirror element 3 is vibrated and warped by the higher harmonic component of the stepping motor, the actual read position is shifted from the correct read position when the mirror is warped. The shift of the read position is observed near the center of the span of the main or fast scan direction, and depends on the period and amplitude of the vibration. When the read position is shifted, the registration of colors is lost in the slow scan direction in the case Of the color image read device for reading color information through a plurality of scans.

When the second and third mirror elements 5 and 6 are vibrated and warped, vertical lines lose their linearity in both side areas as viewed in the fast scan direction (this phenomenon is called a vertical-line distortion). The vertical-line distortion varies a little in level and is observed over the entire range as viewed in the slow scan direction when the stepping motor, which is for driving the scan system, runs in low and medium speed regions. When it runs at a high speed, the vertical-line distortion gradually decreases from its original level. Particularly, in the color image reader, the vertical-line distortion results in the incorrect registration of colors in the fast scan direction.

The optical image reading system of the image read device must be installed in a limited space. In this respect, it is desirable that the mirror vibration killing means is simple in construction.

SUMMARY OF THE INVENTION

The present has been made in view of the above circumstances and has as an object the provision of an image read device which can reduce the vibration of the mirror elements with a simple construction, thereby eliminating the vertical-line distortion and the incorrect registration of colors.

To achieve the above object, in an image read device in which an original document located on a platen glass is exposed to and scanned with a light from a light source, to obtain a light image representative of a picture on the original, and the light image is guided through an optical system including at least first to third mirror elements to an image pick-up unit, improvement is made in that the natural frequencies of the first to third mirror elements are different from each other.

In the image read device, the thicknesses of the second and third mirror elements are different from each other.

Further, the thickness of the first mirror element is larger than the width of the reflecting surface of the first mirror element as viewed in the slow scan direction.

A stiffening plate can be mounted on the surface of any of the first to third mirror elements, which the surface is opposite to the reflecting surface of the mirror.

A bracket can be mounted on the surface of each of the second and third mirror elements, which the surface is opposite to the reflecting surface of the mirror. It should be understood that the above features of anti-vibration and changing the natural frequency may be properly combined for further enhancing the effects of the invention.

The natural frequencies of the second and third mirror elements are different from each other by making the thicknesses of the second mirror element different from that of the third mirror element. Accordingly, if one of the mirror elements resonates with the higher harmonic component of the drive signal, the other does not resonate therewith. The vibration of the second and third mirror elements is reduced as a whole when comparing with the vibration of them both resonating with the higher harmonic component. The vertical-line distortion on both side areas as viewed in the fast scan direction is also reduced.

The rigidity of the first mirror in the direction of its thickness is increased by setting the thickness of the first mirror element wider than the width of the reflecting surface as viewed in the slow scan direction. Accordingly, the vibration of the first mirror element is checked in the thickness direction. The read position varies little near the center of the span of the fast scan. This leads to minimization of the incorrect registration of colors in the slow scan direction.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE PREFERRED EMBODIMENTS

The preferred embodiments of an image read device according to the present invention will be described with reference to the accompanying drawings.

An image read device to which the present invention is applied may be the image read device shown in FIG. 1A, which was discussed in the prior art description. Therefore, the description of the present invention to follow will be given in connection with the prior art description and the drawings referred to therein.

Figure 1B:
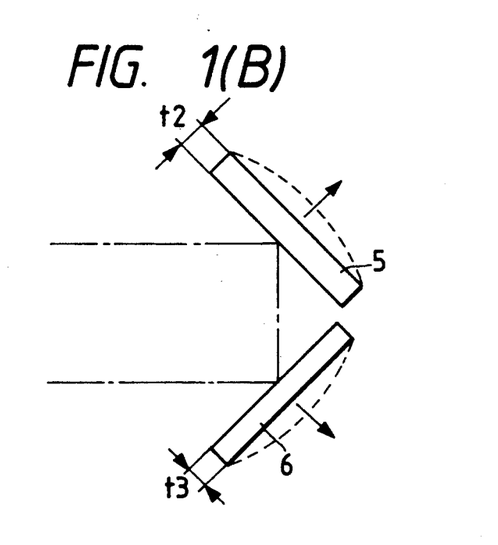
FIG. 1B is a side view showing the layout of first and second mirror elements.

The overall construction of the image read device of which the optical system incorporates the invention is as shown in FIG. 1A. The optical system for the image read device according to a first embodiment of the present invention is shown in FIG. 1B.

In the optical system, the second and third mirror elements 5 and 6 contained therein are arranged as shown, and the natural frequencies of them are different from each other.

The amplitude of a vibration of each mirror element is maximized when the natural frequency of the mirror element is equal to the frequency of the high frequency component of the exciting signal for the motor.

Figure 2B:
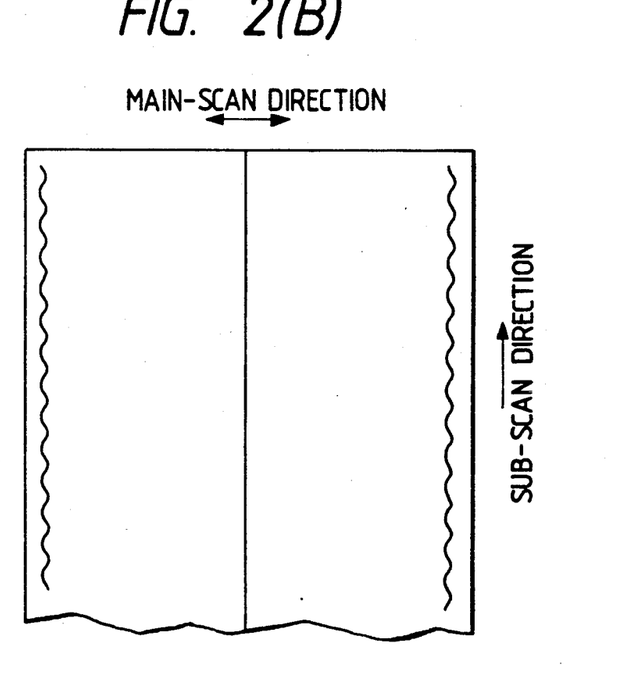
FIG. 2B is an explanatory diagram for explaining a vertical-line distortion.

When the second and third mirror elements 5 and 6 vibrate, the direction of light reflected from a light emitting point A is deviated from the direction of the same when the mirror elements are not vibrated, as shown in FIG. 2A. The deviation of the reflected light direction will create a distortion $\Delta y$ in the read image. The image distortion becomes larger as the image angle $\alpha$ becomes wide. This appears in the form of a vertical-line distortion; that is, wavy patterns appear in both side areas of the image as viewed in the fast scan direction, as shown in FIG. 2B. In the figure, solid lines indicate rays of light when the mirror is not warped, and broken lines indicate those when it is warped.

Usually, the second and third mirror elements 5 and 6 have the same sizes. When the frequency of the higher harmonic component of the exciting signal for the motor resonates with the frequency of the vibration of each mirror element, the vibration of the mirror is amplified, and the warp of the mirror is remarkable. The natural frequency of the mirror element depends on distance between the supports and the thickness of the mirror element.

In the first embodiment, the thickness "t2" of the second mirror element 5 is set to be different from that "t3" of the third mirror element 6 ($t2 \neq t3$), so that the natural frequencies of the mirror elements are different from each other. In this case, either $t2 > t3$ or $t2 < t3$ is allowed, but $t2 < t3$ is preferable. If $t2 < t3$, the mirror element heavier than the other is located under the latter. The center of gravity of the carriage is lowered, so that the carriage is more stable.

Thus, the natural frequencies of the second and third mirror elements 5 and 6 of the second carriage 7 are different from each other since the thickness of the second mirror element 5 is different from that of the third mirror 6. With this feature, even if one of the mirror elements 5 and 6 vibrates to resonate with the higher harmonic component, the vibration of the other will not resonate with the latter. Therefore, the vibration of the second and third mirror elements 5 and 6 is reduced as a whole when comparing with that of the mirror elements both resonating with the higher harmonic component. Further, the vertical-line distortion in both side areas of the image as viewed in the fast scan direction is reduced. Particularly, in the color image read device, the incorrect registration of colors as viewed in the fast scan direction is minimized. When the optical system of the first embodiment is used, there is no need of installing antivibration measurement means for the motor and the drive force transmitting system. Only a simple anti-vibration measurement, if required, is required for them.

Figure 4:
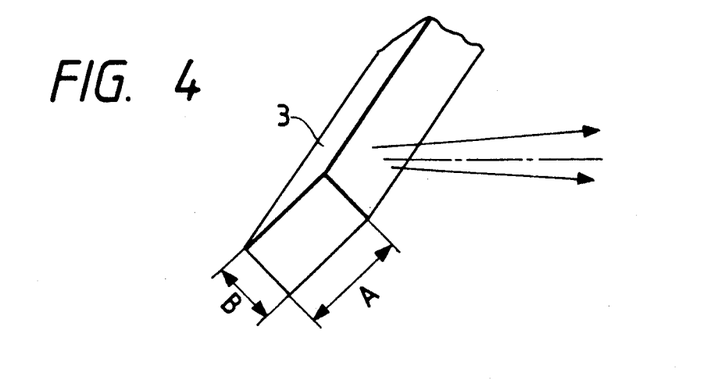
FIG. 4 is a perspective view showing a first mirror element with an anti-vibration structure.

A second embodiment of an optical system according to the present invention is shown in FIG. 4. In the second embodiment, the present invention is applied to the first mirror element 3. When the first mirror element 3 is vibrated, the read position is shifted from its correct position near the center of the fast scan span, as illustrated in FIG. 3. The read position shift varies depending on the period and amplitude of the vibration. To cope with this, in the second embodiment, the first mirror element 3 is constructed such that the thickness A of the first mirror is selected to be larger than the width B of the reflecting surface thereof as viewed in the slow scan direction; $A > B$. Where the relationship, $A > B$, holds, the first mirror element 3 vibrates little in the direction of the thickness A. The first mirror element 3 vibrates in the width B direction, but its vibration has little influence on the image quality. Further, if the thickness A is increased, the weight of the mirror element will be increased a little and the weight increase is negligible, since the reflecting surface of the first mirror element 3 may be narrower than that of the second and third mirror elements 5 and 6.

Thus, in the second embodiment of the invention, the first mirror element 3 has the thickness A larger than the width B of the reflecting surface as viewed in the slow scan direction. Accordingly, the vibration of the mirror element is checked in the thickness A direction. As a result, the read position is varied little near the center of the fast scan span, and the incorrect registration of colors in the slow scan direction is minimized in the slow scan direction.

Figure 5:
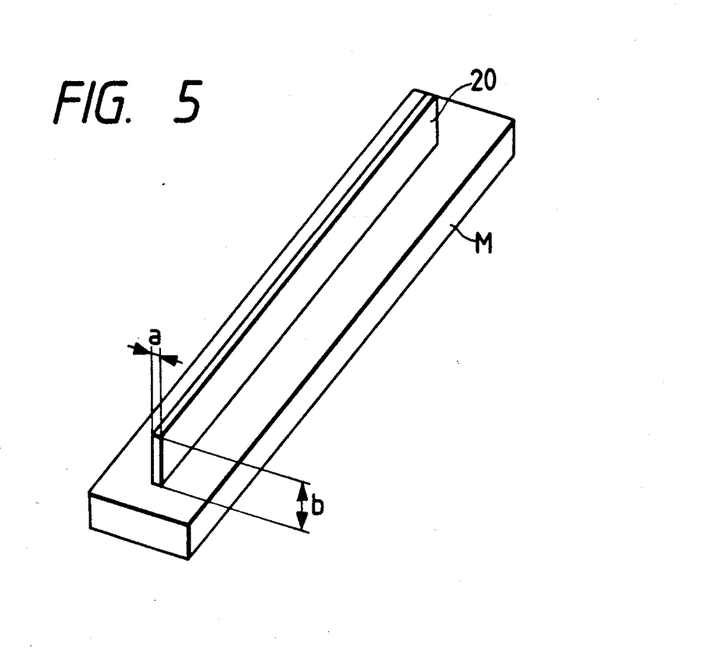
FIG. 5 is a perspective view showing another mirror element with an anti-vibration structure.

A third embodiment of the invention will be described with reference to FIG. 5.

In the third embodiment, in order to change the natural frequency of the mirror element, a stiffening plate 20, as shown, is fastened, by means of suitable means including adhesive, to the surface (back side) of the mirror element M, which is opposite to the reflecting surface of the mirror element. In the embodiment, the natural frequency of the mirror M has been changed by changing its thickness. The plate 20 is shaped such that $a<<b$, where a and b are respectively the thickness and the width of the plate. The plate 20 stands upright on the rear side of the mirror element M. Use of the plate 20 increases the rigidity of the mirror, so that the mirror element is hard to vibrate. As a result, the vibration of the mirror element, when it is vibrated, will be negligible.

Figure 6A:
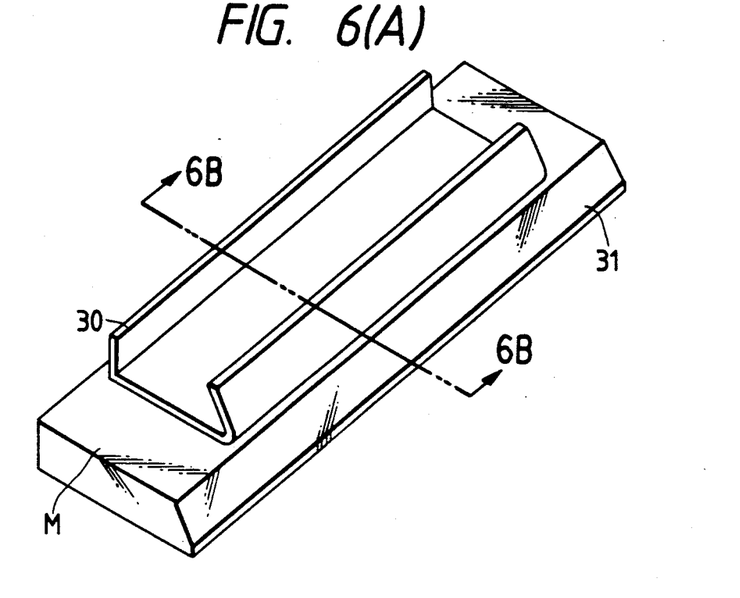
FIG. 6A is a perspective view showing an additional mirror element with an anti-vibration structure.
Figure 6B:
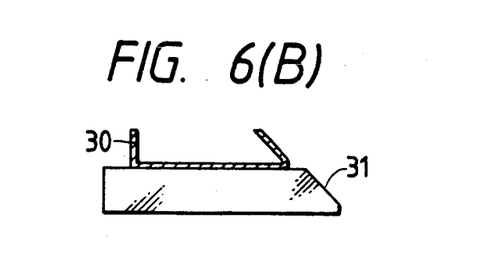
FIG. 6B is a cross sectional view taken on line 6(B)—6(B) in FIG. 6A.

A fourth embodiment of the invention is perspectively and sectionally illustrated in FIG. 6. In the embodiment, a U-shaped bracket 30 in cross section is fastened, by suitable means, to the rear side of the mirror M of which the natural frequency has been increased by changing the thickness. The effects attained by the fourth embodiment is comparable with those of the mirror element of FIG. 5.

In a specific example, the second and third mirror elements 5 and 6 are mounted on the second carriage 7 while being slanted at an angle of 45° with respect to the optical axis of the optical system. The end faces 31 of the second and third mirror elements 5 and 6 are tapered so as to be in alignment with the slant of the mirror elements, in order to maximize the reflecting surfaces of the mirror elements with respect to the vertical direction in which the space is limited. One side of the bracket 30 is inwardly bent to be in line with the tapered end face 31. In this embodiment, the bracket 30 can be disposed within a limited space, so that the anti-vibration structures for the mirror elements are reduced in size.

As seen from the foregoing description, the second and third mirror elements 5 and 6 have the different natural frequencies. Accordingly, the vibration of the second and third mirror elements is reduced as a whole when comparing with that of the second and third mirror elements having the equal natural frequencies. The reduced vibration lessens the vertical-line distortion, which is observed in both side areas in the image as viewed in the fast scan direction.

The first mirror element 3 has a larger thickness than the width of the reflecting surface as viewed in the slow scan direction. Because of the large thickness, the read position varies little near the center of the fast scan span. This leads to minimization of the incorrect registration of colors in the slow scan direction.

Particularly, in the color image read device, the incorrect color registration and the vertical-line distortion observed in the fast and slow scan directions can be minimized. Further, the motor and the drive force transmission system needs no anti-vibration measurement means or only a simple anti-vibration measurement.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. In an image read device in which an original document located on a platen glass is exposed to and scanned with a light from a light source, to obtain a light image representative of a picture on said original, and the light image is guided through an optical system including at least first to third mirror elements to an image pick-up unit, the improvement in which the natural frequencies of said first to third mirror elements are different from each other.

2. The image read device according to claim 1, wherein the thicknesses of said second and third mirror elements are different from each other.

3. The image read device according to claim 1, wherein the thickness of said first mirror element is larger than the width of the reflecting surface of said first mirror element as viewed in the slow scan direction.

4. The image read device according to claim 1, wherein a stiffening plate is mounted on the surface of any of said first to third mirror elements, which the surface is opposite to the reflecting surface of the mirror.

5. The image read device according to claim 4, wherein the height of said stiffening plate is much larger than the width thereof, and said stiffening plate is upright on the surface of said mirror element.

6. The image read device according to claim 1, wherein a bracket is mounted on the surface of any of said first to third mirror elements, which the surface is opposite to the reflecting surface of the mirror.

7. The image read device according to claim 1, wherein said second and third mirror elements are mounted while being slanted at an angle of 45° with respect to the optical axis of the optical system, and have brackets mounted on the surface thereof opposite to the reflecting surface thereof.

8. The image read device according to claim 7, wherein
end faces of said second and third mirror elements are tapered so as to be in alignment with the slant of the mirror elements, and one side of each of said brackets is inwardly bent to be in line with the tapered end face of the corresponding mirror element.

9. An image read device in which an original document located on a platen glass is exposed to and scanned with a light from a light source, to obtain a light image representative of a picture on said original, and the light image is guided through an optical system including at least first to third mirror elements to an image pick-up unit, wherein the thickness of said first mirror element is larger than the width of the reflecting surface of said first mirror element is viewed in the slow scan direction, and the thicknesses of said second and third mirror elements are different from each other.

* * * * *

UNITED STATES PATENT AND TRADEMARK OFFICE
CERTIFICATE OF CORRECTION

PATENT NO. : 5,212,523
DATED : May 18, 1993
INVENTOR(S) : Masuji Ogaiwara et al.

It is certified that error appears in the above-indentified patent and that said Letters Patent is hereby corrected as shown below:

Claim 9, column 8, line 5, change "is" to --as--.

Signed and Sealed this

Nineteenth Day of April, 1994

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,212,523
DATED : May 18, 1993
INVENTOR(S) : Masuji Ogaiwara et al.

It is certified that error appears in the above-indentified patent and that said Letters Patent is hereby corrected as shown below:

On the title page, under item [19] and item [75], change "Ogaiwara" to --Ogiwara--.

Column 8, line 5, claim 9, change "is" to --as--.

Signed and Sealed this

Tenth Day of May, 1994

Attest:

BRUCE LEHMAN

*Attesting Officer*     *Commissioner of Patents and Trademarks*